United States Patent Office 3,720,584
Patented Mar. 13, 1973

3,720,584
PROCESS FOR THE PRODUCTION OF MONO-HYDROXY CARBOXYLIC ACIDS
Kouichi Yamada and Osami Yagi, Tokyo, Japan, assignors to Nippon Oil Company, Limited, Tokyo, Japan
No Drawing. Filed Sept. 8, 1969, Ser. No. 856,179
Claims priority, application Japan, July 9, 1969, 44/53,968
Int. Cl. C12d 1/00
U.S. Cl. 195—49    2 Claims

ABSTRACT OF THE DISCLOSURE

Process for the production of monohydroxy carboxylic acids such as lactic acid wherein Arthrobacter, Alcaligenes or Fusarium microorganisms are aerobically incubated in a culture medium including glycols as a source of assimilable carbon.

This invention relates to a process for the preparation of monohydroxy carboxylic acids by the use of certain microorganisms and more particularly to the industrial production of such useful products as lactic acid and the like by bacterial fermentation under aerobic conditions.

Briefly stated, the process of this invention involves inoculating a culture medium containing glycols as the source of assimilable carbon with a strain isolated from soil and belonging to the genus Arthrobacter, Alcaligenes or Fusarium, aerobically incubating the strain in the medium and separating monohydroxy carboxylic acids in high yields from the incubated medium.

The production of lactic acid, for instance, by the fermentation process has heretofore relied upon the use of relatively expensive naturally occurring materials rich in sugars such as glucose, pulp waste liquor, spent molasses and the like. The culturing conditions for lactic acid bacteria with the use of such carbon sources have been anaerobic, which resulted in increased periods of time for the production of lactic acid from the fermented medium.

The recent trend of the fermentation industry is characterized in one aspect by increasing employment of petroleum or petrochemical products as a substantial supply of fermentation materials in place of the conventional carbohydrates. The production of glutamic acid, for example, will be shortly carried out with the use of acetic acid or normal paraffins superseding the conventional carbon sources.

The present invention has for its object to provide a novel and improved process for the production of monohydroxy carboxylic acids wherein these desired products are obtainable in high yields and with minimum of processing time by the fermentation of a culture broth comprising low-price, readily available glycols utilized as the source of assimilable carbon for the aerobic incubation therein of strains belonging to the genus Arthrobacter, Alcaligenes or Fusarium.

This and other objects and features of this invention will be more apparent from the following description rendered in support of certain specific embodiments of the invention.

The term glycols referred to herein as the carbon source according to the invention includes 1,2-propanediol, 1,3-propanediol and 1,3-butanediol which have been found particularly effective for the culture of the aforementioned microorganisms.

In the fermentation process of the invention, the Arthrobacter, Alcaligenes or Fusarium microorganisms isolated from soil are inoculated into a culture medium including mainly glycols of the type described, inorganic salts and organic nutrients usually required for the growth of bacteria. The so-inoculated culture medium is incubated under aerobic conditions in such a manner as to form and accumulate therein large quantities of monohydroxyl carboxylic acids. The cells are removed from the culture broth by centrifugation, followed by passing the supernatant of the broth through ion-exchange resins to adsorb thereon the resulting monohydroxy carboxylic acids which are then eluted with the use of suitable organic solvents. The eluate may be isolated by means of evaporation. Or, the culture broth, after removal of the cells, may be treated with an alkali or salt such as calcium hydroxide, calcium carbonate and the like thereby to form monohydroxy carboxylate for separation. This salt may be subjected to hydrolysis for the formation of desired monohydroxy carboxylic acid.

STRAINS

The microorganisms capable of producing and accumulating monohydroxy carboxylic acids in their culture broth according to the invention belong to the genus Arthrobacter, Alcaligenes or Fusarium, and these strains are preferably *Arthrobacter oxydans* PG–21–1 (Deposit No. 359, Fermentation Research Institute Agency of Industrial Science and Technology, Tokyo, Japan), *Alcaligenes faecalis* (Deposit No. 360, F.R.I.A.I.S.T.) and *Fusarium solani* (Deposit No.361, F.R.I.A.I.S.T.). Particularly, *Arthrobacter oxydans* PG–21–1 and *Alcaligenes faecalis* have been found to possess the respective bacteriological properties given below.

*Arthrobacter oxydans* PG–21–1

Microscopical observations—

Bacillus strain, generally 0.6 to 0.8 by 1.4 to 2.0 microns. Non-motile. Pleomorphic. Gram-positive in young cultures. Gram-negative in old cultures.

Growth in the media—

Nutrient agar colonies: Circular, convex, glistening, circumferentially pale yellow or grayish white.
Nutrient agar slant: Growth moderate, filiform, glistening.
Nutrient broth: Surface ring, turbid, viscid sediment.
Nutrient gelatin stab: Liquefied.

Biophysical properties—

B.C.P. milk: Alkaline, peptonized.
Nitrate respiration: Negative.
Indole not produced.
Methyl Red test: Negative.
Voges-Proskauer test: Negative.
Starch hydrolyzed.
Hydrogen sulfide not produced.
Catalase produced.
Oxygen demand: Aerobic.
Optimum growth temperature: 25° to 30° C.

Acid but no gas from glycerol and sucrose. Neither acid nor gas from xylose, glucose, lactose and starch. Glucose, gluconic acid, citric acid, succinic acid, para-hydroxybenzoic acid and protocatehuic acid utilized as the sole source of assimilable carbon.

*Alcaligenes faecalis*

Microscopical observations—

Bacillus strain, generally 0.5 by 1 to 2 microns. Motile. Gram-negative.

Growth in the media—

Nutrient agar colonies: Glistening, opaque, entire.
Nutrient broth: Turbid, viscid sediment. Filmy.
Potato medium: Yellowish brown.
Gelatin medium: Surface growth, no liquefaction.

Biophysical properties:

Litmus milk: Alkaline.
Indole not produced.
Oxygen demand: Aerobic.
Optimum growth temperature: 25° to 37° C.

MEDIUM AND METHOD OF CULTURE

The fermentation media according to the invention comprise a carbon source consisting of the afore-said various glycols preferably of 1 to 10% concentration and a nitrogen source including urea, sodium nitrates, potassium nitrate, ammonium water, ammonium sulfate and ammonium nitrate. The medium may further contain dipotassium hydrogenphosphate, magnesium sulfate and similar inorganic salts as well as yeast extract and the like required for promoting the growth of the microorganisms. Suitable culture medium consists of 10 to 100 grams of glycols of the type specified, 3 grams of urea, 1 gram of $K_2HPO_4$, 0.5 gram of $MgSO_4 \cdot 7H_2O$, 0.5 gram of KCl, 0.01 gram of $FeSO_4 \cdot 7H_2O$, 0.5 gram of yeast extract and tap water to make 1 liter.

The medium of such composition is heated at 115° C. and thus sterilized for 10 minutes, followed by inoculation of the contemplated strains. The inoculated medium is cultured by shaking and/or by aeration and agitation at 25°–37° C. for 40 to 96 hours.

SEPARATION AND PURIFICATION OF MONOHYDROXY CARBOXYLIC ACIDS

After the fermentation has been completed, the cells and the solid contents of the culture broth are removed by centrifugation, and the supernatant of the broth is then treated with an anion-exchange resin to adsorb thereon the monohydroxy carboxylic acid produced from the fermentation. The adsorbed acid is eluted with an organic solvent and separated therefrom by, for instance, evaporating the eluate in vacuo. Alternatively, after removal of the cells, the culture broth may be treated with calcium hydroxide, calcium carbonate or other suitable alkali or salts thereby to form monohydroxy carboxylate. The salt thus formed is isolated and hydrolyzed to obtain the corresponding monohydroxy carboxylic acid.

For a better understanding of the invention, the following non-limitative, illustrative examples of presently-preferred embodiment are given, but it is to be understood that certain modifications and changes may be made therein without department from the scope of the invention and appended claims.

EXAMPLE I

A liquid culture medium was prepared having the following composition in grams:

| | |
|---|---|
| 1,2-propanediol | 30 |
| Urea | 4 |
| $K_2HPO_4$ | 1 |
| $MgSO_4 \cdot 7H_2O$ | 0.5 |
| KCl | 0.5 |
| $FeSO_4 \cdot 7H_2O$ | 0.01 |
| Yeast extract | 0.5 |
| Water to make 1 liter. | |

The medium was adjusted to a pH of 8.5 and sterilized at 115° C. for 10 minutes. The temperature was then reduced to 30° C., and the medium was inoculated with 0.2 gram of *Arthrobacter oxydans* PG–21–1 and incubated by shaking at 30° C. Assimilation and dissimilation of the urea were maintained in optimal equilibrium and the pH in the range of 7.0 to 9.0 without adjustment. After 72 hours' cultivation, the culture broth (1 liter) was subjected to centrifugation to remove the cells and the supernatant of the broth passed through an anion-exchange resin to adsorb thereon the lactic acid which resulted from the fermentation. The adsorbed lactic acid was eluted with formic acid, and the eluate was evaporated in vacuo to remove the formic acid thereby obtaining 9.0 grams of lactic acid per liter of culture broth.

EXAMPLE II

The medium and manner of culture was followed after Example I, except that 10 grams of 1,3-propanediol was used as the source of assimilable carbon, the initial pH adjusted to 7.0 and air supplied at 1 liter per minute to the medium by aeration and agitation. The medium was inoculated and incubated with *Arthrobacter oxydans* PG–21–1 at 30° C. After 96 hours incubation, the culture broth was treated in the manner described in Example I, and there was obtained 1.5 grams beta-hydroxy propionic acid per liter of culture broth.

EXAMPLE III

*Arthrobacter oxydans* PG–21–1 was incubated in a culture medium including a carbon source of 10 grams of 1,3-butanediol after the manner described in Example I. After 96 hours' incubation at 30° C., the culture broth was treated also in the manner described in Example I to obtain 2.0 grams of beta-oxy-butyric acid per liter of broth.

EXAMPLE IV

*Alcaligenes faecalis* was cultured in the medium and after the manner described in Example I. After 96 hours' cultivation at 30° C., the medium was treated in the manner of Example I to obtain 3.0 grams of lactic acid per liter of culture broth.

EXAMPLE V

A culture medium was prepared having the following composition in grams:

| | |
|---|---|
| 1,2-propanediol | 30 |
| $NH_4NO_3$ | 3 |
| $K_2HPO_4$ | 1 |
| KCl | 0.5 |
| $MgSO_4 \cdot 7H_2O$ | 0.5 |
| $FeSO_4 \cdot 7H_2O$ | 0.01 |
| Yeast extract | 0.5 |
| Water to make 1 liter. | |

This culture medium was inoculated with 0.3 gram of *Fusarium solani* and incubated at 30° C. after the manner in Example I. After a lapse of 48 hours, 1 liter of culture broth was subjected to centrifugation to remove the cells. The supernatant of the broth was treated with 7 grams of powdery calcium carbonate to separate the sediment for hydrolysis. There was obtained 3 grams lactic acid per liter of broth.

What is claimed is:

1. A process for the production of lactic acid which comprises aerobically incubating a microorganism selected from the group consisting of *Arthrobacter oxydans* PG–21–1, Deposit No. 359 Fermentation Research Institute Agency of Industrial Science and Technology, *Alcaligenes faecalis*, Deposit No. 360 Fermentation Research Institute Agency of Industrial Science and Technology, and *Fusarium solani*, Deposit No. 361 Fermentation Research Institute Agency of Industrial Science and Technology, in a liquid culture medium containing 1,2-propanediol as the source of carbon, and separating said lactic acid accumulated in the culture medium.

2. A process according to claim 1 wherein said culture medium consists of 10 to 100 grams of said 1,2-propanediol, 3 grams of urea, 1 gram of $K_2HPO_4$, 0.5 gram of $MgSO_4 \cdot 7H_2O$, 0.5 gram of KCl, 0.01 gram of $FeSO_4 \cdot 7H_2O$, 0.5 gram of yeast extract and sufficient water to make 1 liter of said medium.

References Cited
UNITED STATES PATENTS 3,553,081   1/1971   Goodhue et al. _____ 195—30

OTHER REFERENCES

Kersters et al., "Oxidation of Glycols," Biochem. Biophys. Acta, vol. 71, p. 311–331, 1963.

Le Bel, appearing in Type Reactions, published by U.S. Dept. of Agr., May 1959.

Marion et al., "Oxidation of Aliphatic Compounds," Water Pollution Control Fed. J., pp. 1269–84, October 1963.

A. LOUIS MONACELL, Primary Examiner

G. M. NATH, Assistant Examiner